United States Patent [19]

Merlo et al.

[11] Patent Number: 5,138,689
[45] Date of Patent: Aug. 11, 1992

[54] OPTICAL FIBER DISTRIBUTION ARRANGEMENT AND METHOD OF STORING SPLICES USING SAME

[75] Inventors: Clifford E. Merlo; Robert A. Freeman; Peter L. J. Frost, all of Ipswich, England

[73] Assignee: British Telecommunications, London, England

[21] Appl. No.: 687,876
[22] PCT Filed: Nov. 23, 1989
[86] PCT No.: PCT/GB89/01404
§ 371 Date: Jun. 4, 1991
§ 102(e) Date: Jun. 4, 1991
[87] PCT Pub. No.: WO90/05927
PCT Pub. Date: May 31, 1990

[30] Foreign Application Priority Data

Nov. 23, 1988 [GB] United Kingdom ............ 8827348

[51] Int. Cl.$^5$ .................... G02B 6/26; B65D 1/34
[52] U.S. Cl. .......................... 385/135; 385/134; 385/95; 206/316.1; 206/557
[58] Field of Search ............ 385/135, 136, 134, 137, 385/31, 66, 95, 99, 68, 55, 59; 206/316.1, 558, 557, 560, 565

[56] References Cited

U.S. PATENT DOCUMENTS

| | | | |
|---|---|---|---|
| 4,765,710 | 8/1988 | Burmeister et al. | 385/135 X |
| 4,818,054 | 4/1989 | George et al. | 385/135 X |
| 4,861,134 | 8/1989 | Alameel et al. | 385/135 X |
| 4,898,448 | 2/1990 | Cooper | 385/135 X |
| 4,911,662 | 3/1990 | Debortoli et al. | 385/135 X |
| 4,934,785 | 6/1990 | Mathis et al. | 385/68 X |
| 4,948,220 | 8/1990 | Violo et al. | 385/55 |
| 4,971,421 | 11/1990 | Ori | 385/135 X |
| 5,052,775 | 10/1991 | Bossard et al. | 385/76 X |
| 5,067,784 | 11/1991 | Debortoli et al. | 385/135 X |
| 5,071,211 | 12/1991 | Debortoli et al. | 385/135 X |
| 5,093,886 | 3/1992 | Smoker et al. | 385/135 |
| 5,093,887 | 3/1992 | Witte | 385/135 |
| 5,097,529 | 3/1992 | Cobb et al. | 385/135 |
| 5,100,221 | 3/1992 | Carney et al. | 385/135 |

FOREIGN PATENT DOCUMENTS

| | | | |
|---|---|---|---|
| 0146478 | 6/1985 | European Pat. Off. | 385/135 X |
| 0155821 | 9/1985 | European Pat. Off. | 385/135 X |
| 2567657 | 1/1986 | France | 385/135 X |
| 56-12607 | 2/1981 | Japan | 385/135 X |
| 60-136710 | 7/1985 | Japan | 385/135 X |
| 2194700 | 3/1988 | United Kingdom | 385/135 X |

*Primary Examiner*—Brian Healy
*Attorney, Agent, or Firm*—Nixon & Vanderhye

[57] ABSTRACT

A distribution arrangement for optical fibre comprising a branched coupling array (1) and a plurality of splice organizers (2) for storing splices associated with connections to the coupling array. Each fibre connected to the array passses through a manifold block (8) that is provided with a plurality of capillaries extending to the splice organizers. Fibres from other parts of the network also pass through the manifold and into the capillaries for conduction to the splice organizers where they are connected to a respective fibre from the coupling array. Preferably the array (1) has alternative winding routes for fibre tails extending from individual couplers within the array to facilitate multiple splice attempts. A preferred splice organizer comprises an enclosure into which coiled fibre loops are introduced and permitted to expand so that they are retained by the resilience of the fibre itself.

15 Claims, 3 Drawing Sheets

OPTICAL FIBER DISTRIBUTION ARRANGEMENT AND METHOD OF STORING SPLICES USING SAME

BACKGROUND OF THE INVENTION

I. Field of the Invention

This invention relates to optical fibre disbribution and in particular but not exclusively to branched networks for optical telecommunications.

II. Prior Art and Other Considerations

Presently optical fibres are utilised in trunk lines for telecommunications but it is desirable to have optical transmission within other points in a network, such as in branches between an exchange and a subscriber. Elements in such branches need to be reliable under the extremes of ambient temperature and to permit broad spectrum transmission over the range of wavelengths utilised, ususally 1300 to 1550 nm. It is also necessary to ensure that minimum losses occur due to microbending as optical fibres emerge from branching elements such as couplers.

SUMMARY

According to the invention there is provided an optical fibre distribution arrangement comprising a coupling array and a splice organiser associated with each input and output line of the coupling array, the splice organisers being mounted to a supporting frame and capable of limited relative movement with respect to one another so as to permit access to the splices stored therein.

A second aspect of the invention provides a coupling array comprising a plurality of independent couplers interconnected by splices in which formers are provided to control the minimum bend radius of fibres extending from the couplers and in which the formers are located such that alternative winding patterns are available to permit different lengths of fibre to be accommodated.

Another aspect of the invention provides a splice organiser comprising a tray having a groove for retaining a splice and a recess for confining loops of optical fibre under their own natural resilience.

A further aspect of the invention provides a method of storing a splice in a splice organiser comprising forming a series of superimposed loops in the fibre extending from each side of the splice and releasing the loops into a confined area of larger size than the loop diameter.

BRIEF DESCRIPTION OF THE DRAWINGS

The invention is now described by way of example with reference to the accompanying drawings in which.

DETAILED DESCRIPTION OF THE DRAWINGS

Figure 1:
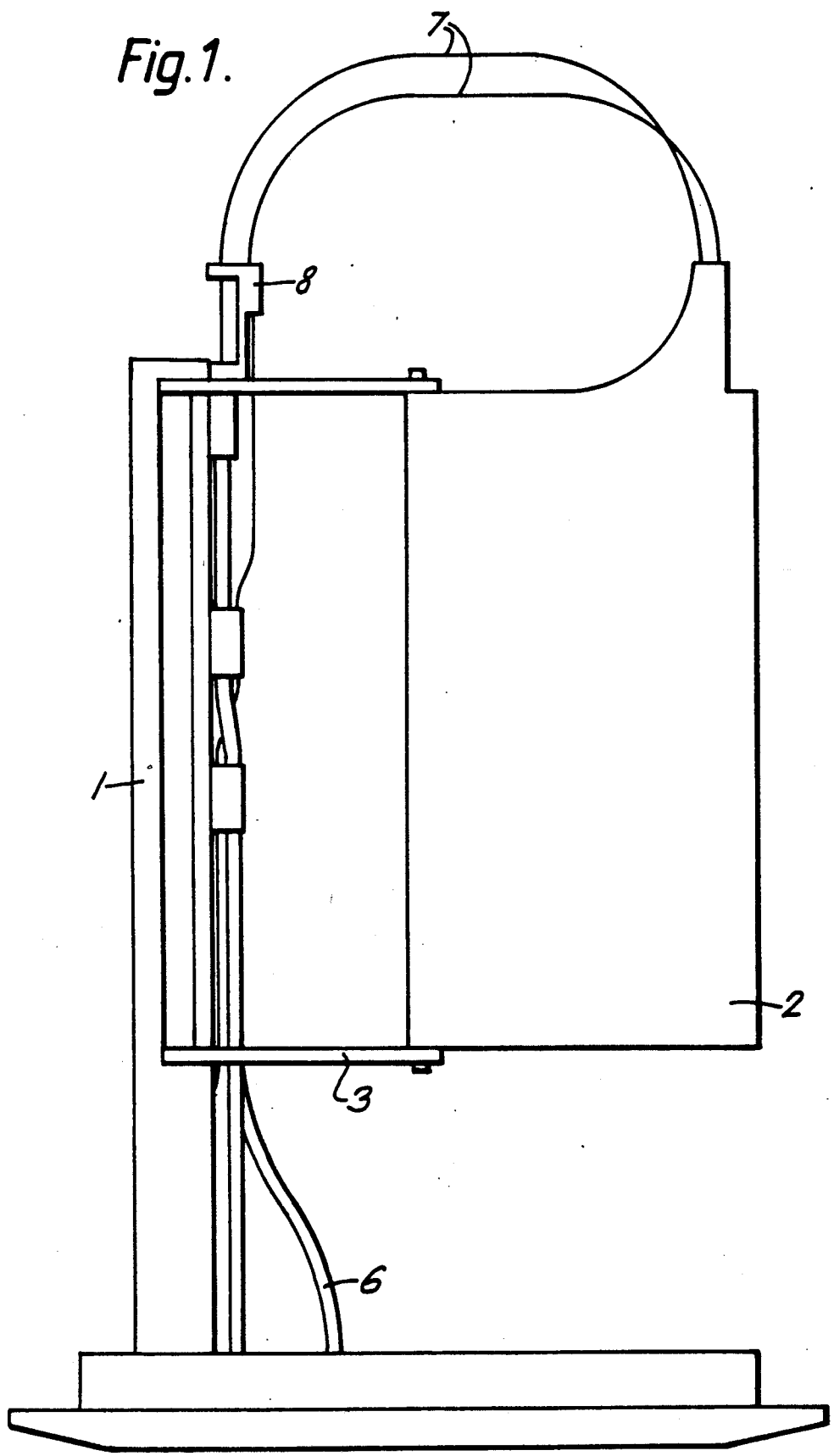
FIG. 1 is a side view of a preferred embodiment of the invention.
Figure 2:
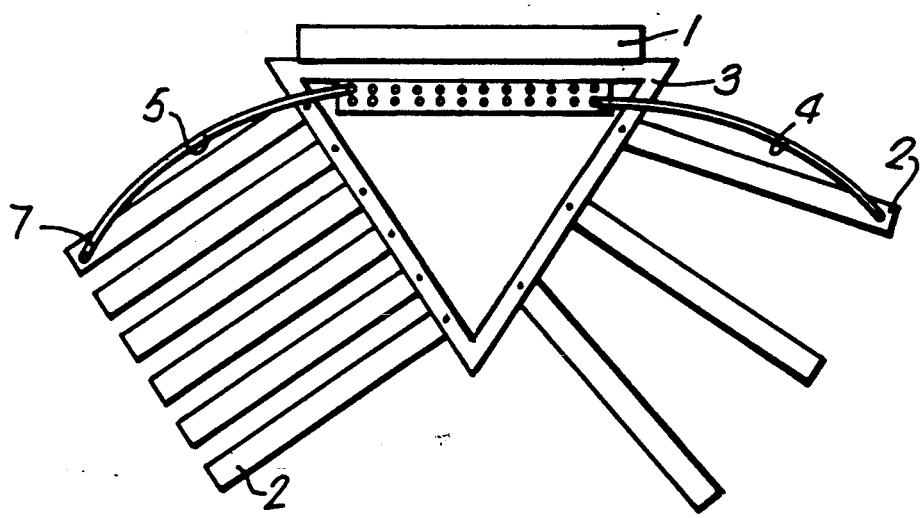
FIG. 2 is a schematic plan of elements of FIG. 1.
Figure 3:
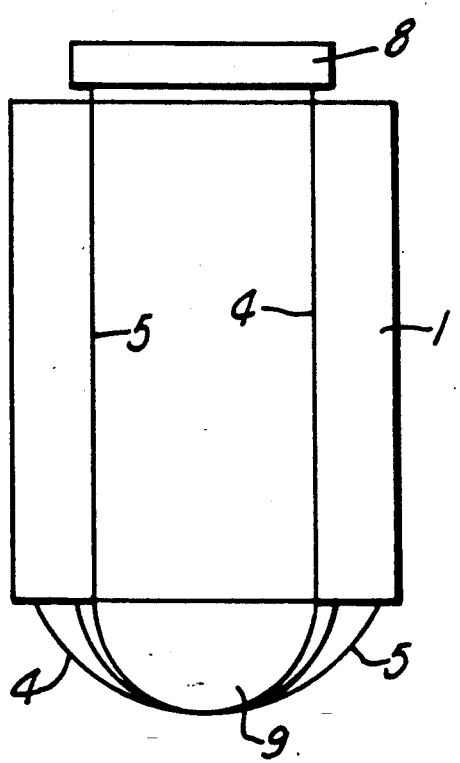
FIG. 3 is a view of part of the embodiment of FIG. 1.
Figure 4:
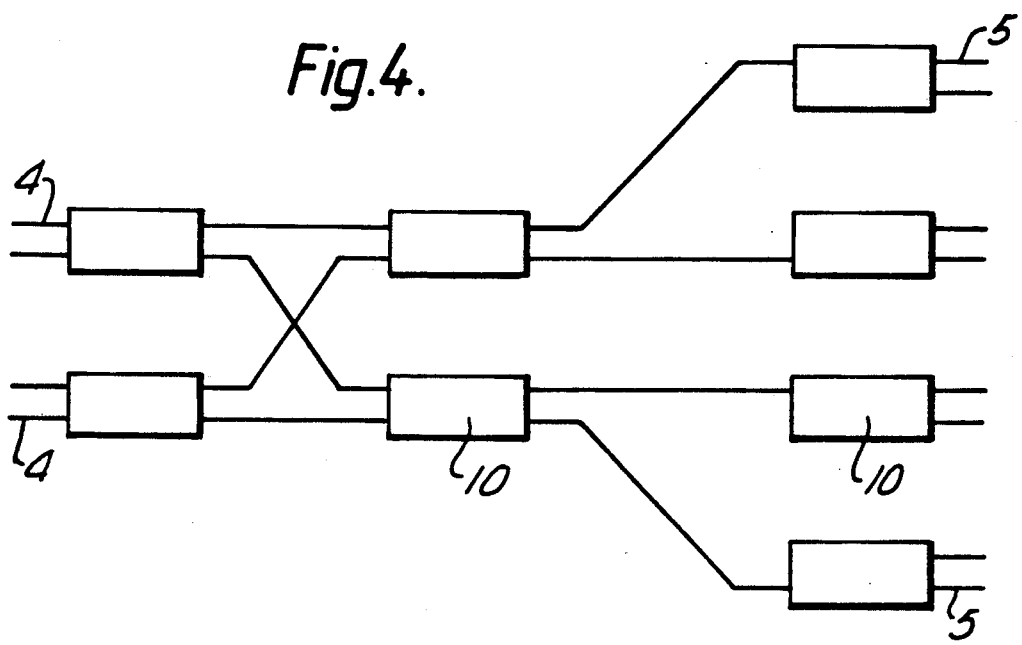
FIG. 4 is a diagram of a coupling array utilised in an embodiment of the invention.

Referring to FIGS. 1 to 3, a distribution point for an optical fibre network is shown which comprises a four to eight coupler array 1 and a plurality of splice organisers 2 mounted on a supporting frame 3. The supporting frame is shown having a triangular section in plan with the coupler array 1 mounted on one side and one of the long edges of each of the splice organisers being pivotally mounted to the other two sides. Other frame configurations are possible, for example square or rectangular, the one shown being illustrative only. The coupler array 1, which is described in more detail later, has four input lines 4 and eight output lines 5 (only one of each shown in FIGS. 2 and 3), each input line being coupled to each output line in the arrangement shown in FIG. 4. It will be realised that in two way communication the input and output lines operate in both directions. Within this specification 'input' is used of the side of a branching arrangement closer to the exchange or trunk line which will generally have fewer lines and 'output' is used of the side further away from the exchange, generally having the greater diversity.

A fibre splice connection is made between each of the input lines to the coupler array 1 and the incoming line from the previous stage of the distribution network, and these splices are stored in respective ones of the splice organisers 2. Each of the output lines 5 from the coupler array 1 is (or may be) spliced to an outgoing line to the next subsequent stage in the distribution network (such as an individual subscriber line), and these splices are also stored in respective ones of the splice organisers 2. Individual access to each splice is possible without disturbing the other lines by pivoting the splice organisers apart at an appropriate point to provide access to the organiser containing the splice to be accessed. Likewise individual access to the splice between the previous distribution stage fibre and the input to the coupler array is possible. Instead of a pivoted arrangement it is envisaged that the edges of the splice organisers could be held in a channel permitting sliding or both sliding and pivoting.

The fibres from the previous and subsequent distribution stages enter the distribution point in reinforcement tubes 6 (FIG. 1) which may conveniently extend inside the frame 3. At the top of the frame these fibres enter transfer capillaries 7 held in a manifold block 8, the capillaries conducting the fibres to the splice organisers where they are connected to their respective input or output fibres that extend from the coupler array 1.

The coupler array 1 is positioned with the entry and exit ports for the fibre pointing downwards, as shown schematically in FIG. 3. A curved former 9 is provided close to the ports either as an extension of the housing of the coupler array or secured to the framework. The fibres entending from the ports pass around the former 9 to the inside of the frame where they pass upwardly, through the manifold block 8 and also into a respective capillary 7 which guides it to the splice organiser where it is spliced to the fibres from the connected parts of the network as described above. In order to minimise the space requirement the fibres pass over the former laterally (as viewed in FIG. 3) and cross over so that they are then threaded through the manifold block on the opposite hand to which they left the coupler array 1. Thus for each input and output line there are two capillaries extending over the top of the distribution point for the fibres on each side of the connection splices for both the input and output lines. The loops are made sufficiently slack to accommodate movement of the splice organisers for access: in this regard it will be noted that the pivoting arrangement enables a large movement for comparatively little extension, and in order to further minimise extension the connection points of the capillaries 7 to the manifold block 8 may be made closer to the organiser pivots for example by modification of the frame shape or the manifold block location.

For provision of telecommunication channels it is only necessary to have one input line and a plurality of output lines (in the present instance one input and eight output) for diversification. The coupler array 1 illustrated has four input lines each of which is split to each of the eight output lines, and with such an arrangement the other three input lines are connected or reserved for additional services or maintainance channels, such as television or OTDR.

The splice organisers 2 may be of any convenient form, or may be replaced by connectors in some instances when loss is not a prime factor or when connectors of suitably low transmission loss are available. Preferably the splice organisers are double sided with one splice located on each side of the organiser, but alternative arrangements are envisaged where the splice organiser stores associated spare fibre loops relating to a single splice on opposite sides of the organiser. In FIG. 2 the right hand side (as viewed) is shown with three organisers which would need to be double sided to receive six (i.e. half) of the splices in the 4 input and 8 output line arrangement. On the left hand side (as viewed) six organisers are shown which would only need to store a single splice and may therefore have the respective fibres from each side of the splice stored on opposite sides of the organiser. It will be observed that the space saving by having double splice storage on each organiser would facilitate a more compact arrangement.

Figure 5:
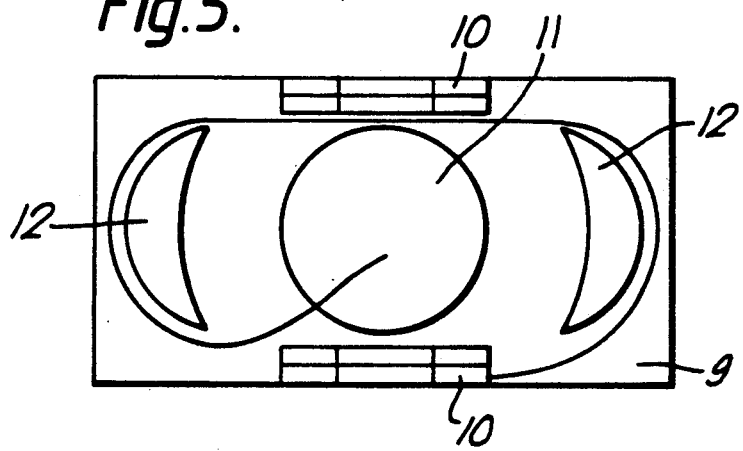
FIG. 5 is a preferred form housing for the coupler array.

FIG. 5 illustrates a plan view of the four to eight coupler. In order to be of a convenient overall size the array container is of the order of 158 mm × 85 mm × 16 mm. One of the disadvantages of existing couplers is the inflexibility of the internal arrangements to splicing errors since the location of the coupling elements, fibre tails and splices is strictly controlled with no storage space for spare lengths of fibre, and thus a splice failure can render the components useless unless one of the splice locations requiring a shorter length of fibre to reach is still available. In the coupler according to the present invention guides for spare fibre tail lengths are provided with alternative winding paths available so that in the event of a splice failure the fibre tail lengths may be wound round a shorter route and the fibre shortened for a subsequent splicing attempt.

Referring to FIG. 5, the housing for the coupler array 1 comprises a tray 9 which has recesses on each side for retaining a bundle of four two by two couplers 10, a raised circular former 11 and a pair of raised curved formers 12. The couplers 10 are each wavelength independent two by two couplers connected in the scheme shown in FIG. 4. In order to accommodate the couplers 10 in the limited space they are arranged side by side in pairs on opposite sides of the central former 11, and two layers deep. Fibre tails from the couplers 10 are wound first around the outside of the curved former 12 on the side of the coupler 10 from which the fibre tail extends and then around the outside of the other curved former and diagonally over the centre of the circular former 11 where it is spliced to the fibre tail of the other of the couplers 10 to which it is connected. A single fibre track is shown in FIG. 5. In the event of a splice failure the fibre tails associated with the failed splice may be unwound and rewound around the guides in a shorter path, for example by passing the first curve of the fibre tail around the circular former rather than around the curved former, the fibres may then be shortened and a new splice made. In this way at least a second attempt at splicing is enabled: additional lengths of spare fibre to permit a larger number of splice attempts may also be stored by provision of extra loops or a different winding pattern, (e.g. a figure of 8 may be used).

Grooves for retaining the splices may be provided or these may be glued in position on the circular former. One advantage of the looped winding around formers is that comparatively loose turns may be made so that the fibre is not pulled into close contact with the edges of the formers, and this enables the loops to accommodate dimensional changes due to thermal expansion without strain. The formers may be varied in shape, in particular the central former may be split or elongated. A four to four coupler may be made in a similar way by only utilising four couplers 10 and arranging these in a single layer rather than in a two layer arrangement as is used for the four to eight coupler described.

Figure 6:
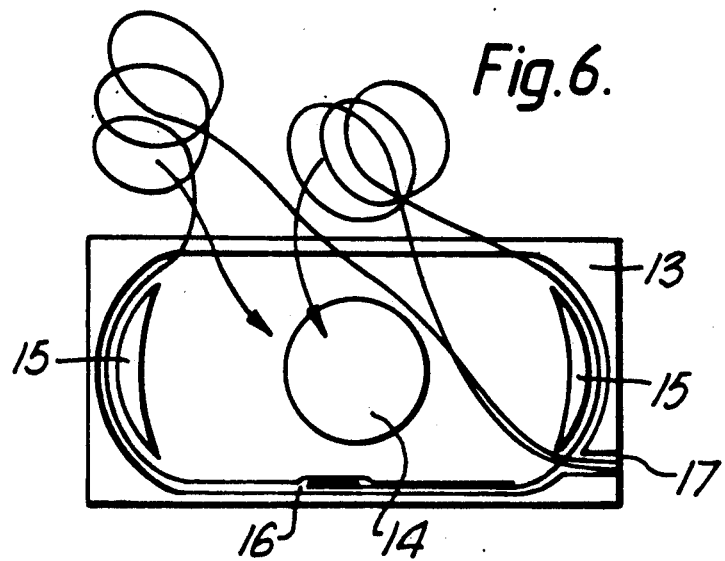
FIG. 6 is a preferred embodiment of a splice organiser.

FIG. 6 shows a preferred splice organiser which enables a single splice to be stored on one side of an organiser. The organiser comprises a tray 13 having a central raised circular former 14, two raised curved end formers 15 and a splice retaining groove 16. The splice is positioned in the groove and the fibres pass out of the organiser along a channel 17, and, when the splice organiser is in a distribution assembly, in to capillaries 7. It is for this latter purpose that the fibres exit in the same direction. In alternative uses a similiar arrangement but with separate exit channels may be preferred. Spare loops of fibre on each side of the splice are stored in the organiser by forming coils of fibre and placing these (as indicated by the arrows in FIG. 6) over the central former with the first bend after the splice being passed around the outer side of the curved former. The natural resilience of the fibers will cause the coils to expand outwardly into a configuration of varying diameter elliptical turns. This procedure is then repeated for the fibre on the other side of the splice. Care has to be taken not to coil the fibres over tightly in the first instance. A hinged or clip on lid may be provided to cover the organiser or it may be arranged to cooperatively engage with an adjacent organiser so that the confronting organisers effectively from covers for each other. The reverse side of the organiser preferably has a similar configuration for storing another splice, thereby enabling six organisers to independently store the twelve splices associated with the distribution point described.

We claim:

1. An optical fibre distribution arrangement comprising a coupler array and a plurality of splice organisers, a respective splice organiser being associated with each input line and each output line of the coupler array, the splice organisers being mounted on a supporting frame so as to be capable of limited relative movement with respect to one another so as to permit access to splices stored therein.

2. An arrangement as claimed in claim 1, wherein the coupler array comprises eight wavelength-independent two-by-two couplers arranged as a four-by-eight coupler.

3. An arrangement as claimed in claim 1, wherein the splice organisers are pivotally mounted on the support frame.

4. An arrangement as claimed in claim 1, wherein the splice organisers are slidingly mounted on the support frame.

5. An arrangement as claimed in claim 1, wherein optical fibres extending from the coupler array pass into a manifold block provided with a respective capillary tube for conducting each fibre to a splice organiser.

6. An arrangement as claimed in claim 1, wherein the coupler array comprises a plurality of independent couplers interconnected by splices, and wherein formers are provided to control the minimum bend radius of fibres extending from the couplers, and wherein the formers are located such that a plurality of potential winding patterns are available to permit different lengths of fibre to be accommodated.

7. An arrangement as claimed in claim 6 in which there is a central former and two outer formers.

8. An arrangement as claimed in claim 6, wherein the independent couplers are stacked in layers.

9. An arrangement as claimed in claim 6, comprising eight-by-two couplers located in bundles of four on opposite sides of the central former.

10. A method of storing a splice in a splice organiser, comprising forming a series of superimposed loops in the fibre extending from each side of the splice and releasing the loops into a confined area of larger size than the loop diameter, the constrained natural resilience of the fibre maintaining the fibre in a looped arrangement.

11. An arrangement as claimed in claim 1, wherein each splice organiser comprises a tray having a groove for retaining a splice and a recess for confining loops of optical fibre under their own natural resilience.

12. An optical fibre distribution arrangement comprising a coupler array and a plurality of splice organisers, the optical fibres extending from the coupler array passing into a manifold block mounted on a support frame, each respective splice organiser being associated with each input line and each output line of the coupler array, the splice organisers being mounted on the supporting frame so as to be capable of limited relative movement with respect to the manifold block.

13. An arrangement as claimed in claim 12, wherein the coupler array comprises eight wavelength-independent two-by-two couplers arranged as a four-by-eight coupler.

14. An arrangement as claimed in claim 12, wherein the splice organisers are pivotally mounted on the support frame.

15. An arrangement as claimed in claim 12, wherein the splice organisers are slidingly mounted on the support frame.

* * * * *